UNITED STATES PATENT OFFICE.

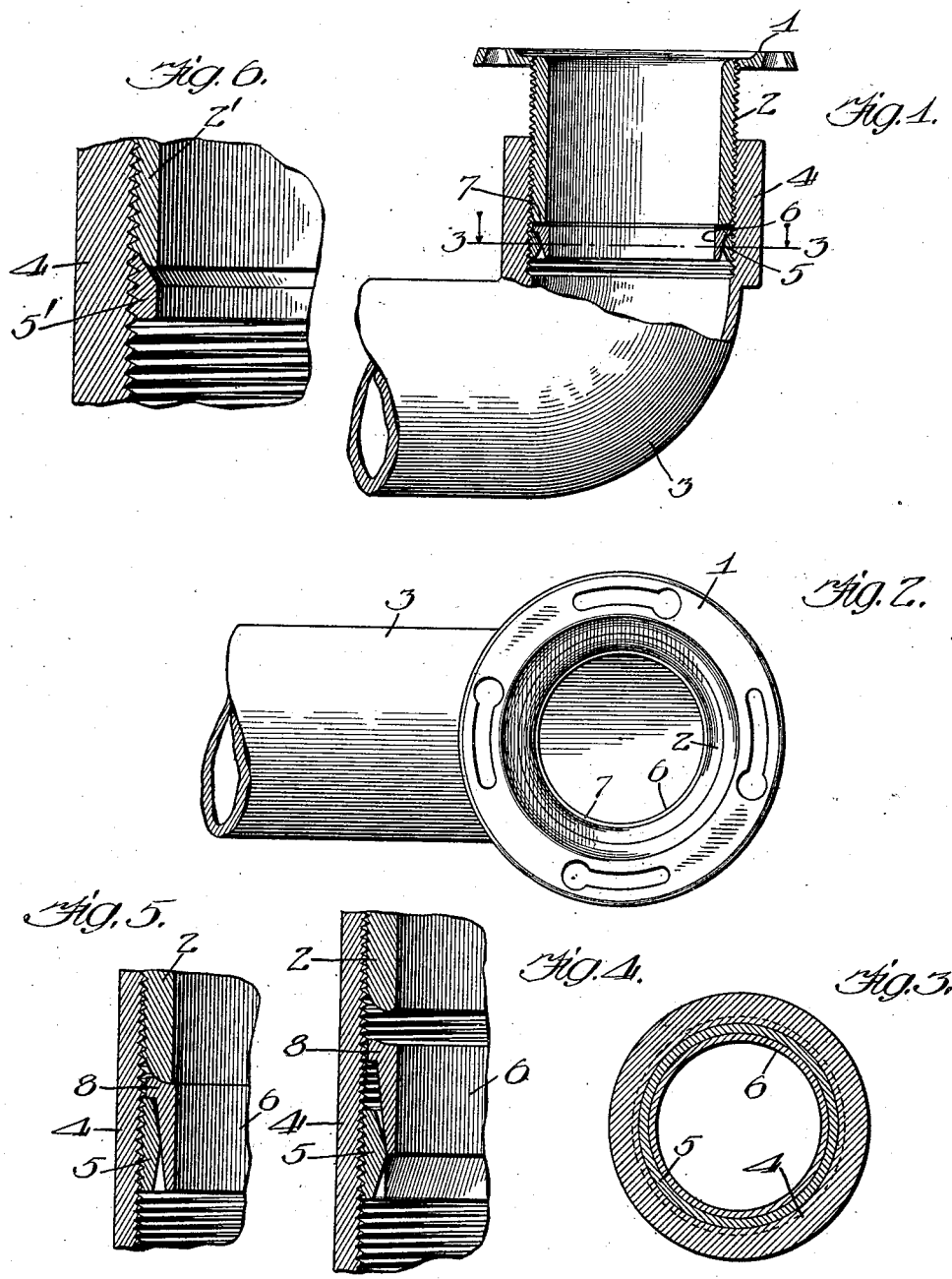

ROBERT J. FARRELL, OF CHICAGO, ILLINOIS, ASSIGNOR OF ONE-HALF TO EDWARD A. ARMBRUSTER, OF CHICAGO, ILLINOIS.

PIPE-FITTING.

No. 903,280.  Specification of Letters Patent.  Patented Nov. 10, 1908.

Application filed February 11, 1907. Serial No. 356,725.

*To all whom it may concern:*

Be it known that I, ROBERT J. FARRELL, a citizen of the United States, residing at Chicago, in the county of Cook and State of Illinois, have invented certain new and useful Improvements in Pipe-Fittings, of which the following is a description.

My invention relates to means for connecting threaded pipes and fittings whereby the relative positions of the pipes to each other may be adjusted as desired and an absolutely tight joint between the pipes secured.

The object of my invention is to produce a simple and convenient device of the kind described, and which may be easily and quickly adjusted to suit the varying conditions found in actual practice.

To this end my invention consists in the novel construction, arrangement, and combination of parts herein shown and described and more particularly pointed out in the claims.

In the accompanying drawings, wherein like or similar reference characters indicate like or corresponding parts; Figure 1 is an elevation of one form of my device with portions broken away to more clearly show the construction. Fig. 2 is a plan view of the form shown in Fig. 1. Fig. 3 is a section taken substantially on line 3—3 of Fig. 1. Fig. 4 is an enlarged partial diametrical section showing a portion of one side of a slightly modified form of fitting before the connection is finally adjusted. Fig. 5 is a similar section showing the parts in their finally adjusted position. Fig. 6 is a similar section showing a slightly modified form of my device.

In the work of erecting threaded pipes for any purpose, it frequently occurs that the positions of two pipes or fittings, which are to be connected, are controlled by the nature of surrounding structures or other unalterable conditions. In such cases the usual practice is to procure a fitting of suitable length to make the connection, and where a number of such connections have to be made, as in fitting the steam, gas, water, or drainage piping in a building, it becomes both annoying and expensive. My device is particularly designed to obviate this difficulty.

In the drawings for the purpose of illustration my device is shown as a part of a drainage system of a building and employed to connect a closet floor flange to a fitting connected to the main soil pipe in the usual or any preferred manner (not shown.) In the drawings the fittings is shown as an elbow or quarter turn bend, and forms a part of my device, but it is obvious that my device will operate as well in connection with any form of fitting or pipe upon which an internally threaded sleeve may be attached or formed, and where in the claims I refer to an "internally threaded sleeve" I desire to be understood as referring to such a threaded sleeve formed upon, or adapted to be secured to, an opening of a pipe, or fitting of any form or character, or in the end of a straight length of pipe.

In the drawings, 1 is a closet floor flange, 2 is an externally threaded nipple rigidly secured thereto in any suitable manner, 3 is the fitting referred to which is connected to the main soil pipe, and 4 is an internally threaded sleeve forming, in the construction shown a part of the fitting 3. The nipple 2 and sleeve 4 are preferably formed to coöperate and for this purpose their threaded engaging portions are preferably formed parallel so that the length of engagement between the nipple and sleeve may be of any length desired, that is, if desired this nipple may be screwed into the sleeve until the flange 1 is brought into close proximity to the end of the sleeve 4, or, the length of engagement may be as short as consistent to secure a rigid connection between the two. Obviously however such an engagement would require packing or some other means to prevent the escape of fluid between the sleeve and the nipple. For this purpose I provide a suitable ring or other equivalent means adapted to engage the interior of the sleeve 4 and to be arranged at any suitable position therein so as to engage the nipple 2 and limit the length of its engagement with the sleeve and at the same time to form a seal to prevent the passage of fluid between the sleeve and nipple. Any suitable means may be employed for this purpose. In the forms shown in Figs. 1, 4, and 5, a ring 5 is provided formed of some suitable ductile material threaded upon its exterior to engage with the threads upon the sleeve 4. A tapering member 6 is also provided adapted to engage the interior of the ring 5 and with a flange 8 or other suitable part positioned in the path of the nipple 2 so that as the nipple moves longitudinally of the sleeve its extremity will engage the tapering member and force the same into the ring thus expanding the same into the thread and providing an absolutely tight joint, as well as locking the same in position to form a stop to limit the length of engagement between the sleeve and the nipple.

In the form shown in Fig. 1 a band of canvas, asbestos, or other suitable material 7 is positioned between the flange 8 and the extremity of the nipple 2 to form an absolutely fluid tight joint at this point. In Figs. 4 and 5 however the extremity of the nipple 2 is accurately finished as well as the coöperating part of the flange 8 thus rendering the use of packing or other resilient material at this point unnecessary. In Fig. 6 the tapering member 6 is dispensed with and the ring 5′ is formed to coöperate directly with the end of the nipple 2′ both being preferably tapered so that the extremity of the nipple 2′ will directly engage the ring 5′ and force the same into the threads in a manner somewhat similar to that already described.

In operation the fitting 3 or other parts carrying the sleeve 4 is connected in any suitable manner to the main system of piping or other parts in the usual or any preferred manner, after which knowing the length of the nipple 2 the ring 3 is suitably positioned within the sleeve 4 by measurement or other satisfactory means, after which the member 6 is placed in position and the nipple 2 screwed down until the joint is made complete, bringing the flange 1 or other parts to which the nipple 2 is connected exactly to the predetermined position desired.

Having thus described my improvement, it is obvious that various immaterial modifications may be made in my device without departing from the spirit of my invention, hence I do not wish to be understood as limiting myself to the exact form and construction shown.

What I claim as new, and desire to secure by Letters Patent is:

1. A pipe connection comprising an internally threaded sleeve, an externally threaded part adapted to coöperate with said sleeve, and an expansible ring positioned within said sleeve, in combination with a member arranged to be operated by the movement of said threaded part, adapted to enter said ring, and expand the same thereby locking said ring in position and limiting the length of the engagement between said sleeve and threaded part.

2. A pipe connection comprising an internally threaded sleeve, an externally threaded pipe adapted to coöperate with said sleeve, and an expansible threaded ring positioned within said sleeve and engaging the threads thereof, in combination with a member arranged to be operated by the movement of said pipe adapted to enter said ring and expand the same, thereby locking said ring in position and limiting the length of the engagement between said sleeve and pipe.

3. A pipe connection comprising an internally threaded sleeve, an externally threaded nipple adapted to coöperate with said sleeve, and a single expansible threaded ring positioned within said sleeve, in combination with a member arranged to be operated by the movement of said nipple, adapted to enter said ring and expand the same, thereby locking said ring in position and limiting the length of the engagement between said sleeve and nipple.

4. A pipe connection comprising an internally threaded sleeve, an externally threaded part adapted to coöperate with said sleeve, and an expansible ring positioned within said sleeve, in combination with a tapering tubular member positioned in the path of said threaded part and adapted to enter said ring and expand the same, thereby locking said ring in position and limiting the length of the engagement between said sleeve and threaded part.

5. A pipe connection comprising an internally threaded sleeve, an externally threaded nipple adapted to coöperate with said sleeve, and a single expansible threaded ring positioned within said sleeve and engaging the threads thereof, in combination with a member arranged to be operated by the movement of said nipple and adapted to enter said ring and expand the same, thereby locking said ring in position and limiting the length of the engagement between said sleeve and nipple.

6. In a pipe connection, an internally threaded sleeve, an externally threaded nipple adapted to coöperatively engage said sleeve, an expansible ring positioned within said sleeve adapted to limit the length of engagement between said sleeve and nipple, and a member operated by the movement of said nipple within said sleeve for expanding said ring to lock the parts in position and prevent the passage of fluid between said sleeve and nipple.

7. In a pipe connection, an internally threaded sleeve, an externally threaded nipple adapted to coöperatively engage said sleeve, an expansible ring positioned within said sleeve adapted to limit the length of engagement between said sleeve and nipple, and a tapering tubular member coöperating with said ring with a part positioned in the path of said nipple, whereby the movements of said nipple in said sleeve will move said member and expand said ring to lock the parts in position and prevent the passage of fluid between said sleeve and nipple.

8. In a pipe connection, an internally threaded sleeve, an externally threaded nipple adapted to coöperatively engage said sleeve, a threaded ring positioned within and engaging the threads of said sleeve, adapted to limit the length of engagement between said sleeve and nipple, a tubular member coöperating with said ring with a part positioned in the path of said nipple, and resilient material positioned between said tubular member and said nipple, whereby the movement of said nipple in said sleeve will lock the parts in position and prevent the passage of fluid between said sleeve and nipple.

9. A pipe connection comprising an internally threaded sleeve, an externally threaded nipple adapted to coöperate with said sleeve, and a single expansible threaded ring positioned within said sleeve and engaging the threads thereof, in combination with a tapering tubular member positioned in the path of said nipple and adapted to enter said ring and expand the same, thereby locking said ring in position and limiting the length of the engagement between said sleeve and nipple.

10. A pipe connection comprising an internally threaded sleeve, an externally threaded pipe adapted to coöperate with said sleeve, and a single expansible threaded ring positioned within said sleeve, in combination with a tapering tubular member positioned in the path of said pipe and adapted to enter said ring and expand the same thereby locking said ring in position and limiting the length of the engagement between said sleeve and pipe.

11. A pipe connection comprising an internally threaded sleeve, an externally threaded pipe adapted to coöperate with said sleeve, and an expansible metallic ring positioned within said sleeve and engaging the threads thereof, in combination with a tapering tubular member positioned in the path of said pipe and adapted to enter said ring and expand the same thereby locking said ring in position and limiting the length of engagement between said sleeve and pipe.

In testimony whereof, I have hereunto signed my name in the presence of two subscribing witnesses.

ROBERT J. FARRELL.

Witnesses:
BURTON U. HILLS,
CHARLES I. COBB.